United States Patent [19]

Burkhalter et al.

[11] Patent Number: 4,687,516

[45] Date of Patent: Aug. 18, 1987

[54] LIQUID FLUID LOSS CONTROL ADDITIVE FOR OIL FIELD CEMENTS

[75] Inventors: John F. Burkhalter; Willis A. Weigand, both of Duncan, Okla.

[73] Assignee: Halliburton Company, Duncan, Okla.

[21] Appl. No.: 680,428

[22] Filed: Dec. 11, 1984

[51] Int. Cl.$^4$ .......................... C04B 7/02; C04B 24/00
[52] U.S. Cl. ......................................... 106/90; 106/93; 166/293; 166/283
[58] Field of Search ........................... 106/93, 90, 314; 166/293, 283

[56] References Cited

U.S. PATENT DOCUMENTS

| | | | |
|---|---|---|---|
| 4,258,790 | 3/1981 | Hale | 166/293 |
| 4,283,229 | 8/1981 | Girg et al. | 106/171 |
| 4,433,731 | 2/1984 | Chatterji et al. | 166/293 |
| 4,435,217 | 3/1984 | House | 106/171 |
| 4,455,169 | 6/1984 | Chatterji et al. | 106/93 |
| 4,462,836 | 7/1984 | Baker et al. | 106/92 |
| 4,507,420 | 3/1985 | Rosenberger | 568/720 X |

*Primary Examiner*—William R. Dixon, Jr.
*Assistant Examiner*—A. Knab
*Attorney, Agent, or Firm*—Robert A. Kent

[57] ABSTRACT

Liquid fluid loss control additives for oil field cements are provided which have long storage lives without excessive settling and which can be mixed with cement slurries without the formation of gel balls or fish eyes. The liquid additives consist essentially of a liquid hydrocarbon, a hydrophilic water soluble polymer, an organophilic clay suspending agent, an organic sulfonate dispersant, a polyamide amine surfactant for oil wetting the polymer and a surfactant for stripping liquid hydrocarbon from the polymer when contacted with water.

20 Claims, No Drawings

LIQUID FLUID LOSS CONTROL ADDITIVE FOR OIL FIELD CEMENTS

BACKGROUND OF THE INVENTION

1. Field of the Invention

The present invention relates generally to liquid fluid loss control additives for oil field cements, and more particularly, to liquid fluid loss control additives which can be stored and then efficiently combined with a cement slurry or the water to be used for forming the slurry.

2. Description of the Prior Art

In cementing operations carried out in oil, gas and water wells, a hydraulic cement is normally mixed with sufficient water to form a pumpable slurry and the slurry is pumped into a subterranean zone to be cemented by way of the well bore penetrating such zone. After placement in the zone, the cement slurry sets into a hard mass.

Certain hydrophilic water soluble polymers have long been recognized by those skilled in the art of oil field cementing as cement additives useful in reducing fluid loss from cement slurries to surrounding subterranean formations as the slurries are being placed or after placement and prior to setting. It is desirable to include fluid loss additives in oil field cements for various reasons. In primary cementing, where a cement slurry is placed in the annulus between a casing or liner and the well bore to seal the annulus and bond the casing or liner to adjacent earth formations, loss of fluid to the formations can result in premature gelation of the cement slurry and bridging of the annulus before proper placement of the slurry. In remedial cementing operations, the control of fluid loss is necessary to achieve the more precise cement slurry placement associated with such operations.

The hydrophilic water soluble polymers commonly utilized as fluid loss agents in cement slurries are solids and have in the past required elaborate mixing apparatus and techniques. That is, when dry powdered hydrophilic polymers are contacted with water in which they are being mixed, unless particular care and special mixing techniques and apparatus are utilized, agglomerated particles form masses referred to as gel balls and/or fish eyes which are difficult to break up and dissolve in the water. These problems as well as the special mixing apparatus and techniques are obviated when the hydrophilic fluid loss control polymers are combined with cement slurries or the water used to form the slurries in the form of liquid additives.

Various liquid fluid loss control additives for oil field cements have been developed heretofore. However, they generally have been difficult to handle because of their high viscosity and have contained relatively low concentrations of hydrophilic fluid loss control polymers making their use expensive. Several liquid fluid loss control additives have been developed wherein the hydrophilic polymer or polymers are suspended in water insoluble organic liquids along with surfactants and thickeners. These liquid additives often suffer from excessive settling when stored and the settled materials develop extremely high viscosities making such materials very difficult to resuspend in the additive.

U.S. Pat. No. 4,435,217 issued Mar. 6, 1984 discloses concentrated hydrophilic polymer suspensions having improved thermal aging stability. That is, in accordance with the patent, liquid polymer suspensions formed with organic liquids are provided with improved resistance to settling and the development of high viscosity settled materials by the addition of liquid fatty acids to the suspensions.

By the present invention, hydrocarbon base liquid fluid loss control additives for oil field cements are provided which contain high concentrations of fluid loss control polymers, which obviate the mixing and settling problems mentioned above and which are efficient and inexpensive to use.

SUMMARY OF THE INVENTION

Liquid fluid loss control additives for oil field cements are provided consisting essentially of a liquid hydrocarbon present in the additive in an amount comprising the balance of such additive in addition to its other constituents, a hydrophilic water soluble polymer present in the additive in an amount in the range of from about 1% to about 50% by weight of the additive, an organophilic clay suspending agent present in the additive in an amount in the range of from about 1% to about 5% by weight of the additive, an organic sulfonate dispersant selected from the group consisting of the salts of polyvinyl sufonic acid and naphthalene sulfonic acid condensed with formaldehyde present in the additive in an amount in the range of from about 1% to about 25% by weight of the additive, a polyamide amine surfactant for oil wetting the polymer selected from the group consisting of the condensation products of fatty acids having in the range of from about 14 to about 22 carbon atoms and ethylene amine compounds present in the additive in an amount in the range of from about 0.1% to about 1.0% by weight of the additive, and a surfactant for stripping liquid hydrocarbon from the polymer when in contact with water selected from the group consisting of aliphatic alcohols having in the range of from about 6 to about 18 carbon atoms reacted within the range of from about 5 to about 10 moles of ethylene oxide per mole and octyl, nonyl and dodecyl phenol reacted within the range of from about 4 to about 20 moles of ethylene oxide per mole present in the additive in an amount in the range of from about 1% to about 10% by weight of the additive. The liquid fluid loss control additive also optionally can contain a dispersant such as polyvinyl pyrrolidone present in an amount in the range of from about 1% to about 5% by weight of the additive. Methods of mixing an oil field cement using the liquid fluid loss control additives and methods of forming the additives are also provided.

While a principal object of the liquid fluid loss control additives and methods of this invention is to combat the problems mentioned above encountered in forming and using oil field cements, it is to be understood that the additives and methods can be utilized in a variety of other well treatment fluids, e.g., fracturing fluids, drilling fluids, etc.

DESCRIPTION OF PREFERRED EMBODIMENTS

The liquid fluid loss control additives of the present invention are utilized in aqueous hydraulic cement slurries for reducing fluid loss from the slurries to permeable formations contacted by the slurries during and after placement in a zone to be cemented. Once placed, the slurries set into hard masses having required compressive strengths. While various hyraulic cements can be utilized in forming the slurries, Portland cements of the various types identified as API Classes A-H and J cements are commonly utilized. These cements are identified and defined in *API Specification for Materials and Testing for Well Cements*, API Spec. 10, Second Edition, June 15, 1984, of the American Petroleum Institute which is incorporated herein by reference.

In accordance with the present invention, hydrocarbon base liquid fluid loss control additives for oil field cements are provided which can be stored for relatively long periods of time without excessive settlement of solid materials or the settlement of solid materials which develop extremely high viscosities. The liquid additives contain high concentrations of one or more hydrophilic water soluble polymers which function in oil field cements to control and reduce water loss therefrom. The additives can be readily and efficiently mixed with a cement slurry or with the water to be used in forming a cement slurry without the formation of gel balls or fish eyes.

The hydrocarbon base liquid fluid loss control additives of the present invention consist of a liquid hydrocarbon, one or more hydrophilic water soluble polymers, an organophilic clay suspending agent, an organic sulfonate dispersant, a polyamide amine surfactant for oil wetting the polymer and a surfactant for stripping liquid hydrocarbon from the polymer when in contact with water, in particular amounts.

The liquid hydrocarbons which can be utilized in the additive are those having a relatively low viscosity and high flash point which do not bring about substantial swelling of the water soluble polymers utilized. Suitable liquid hydrocarbons include light mineral oils, diesel oil, kerosene and various other petroleum fractions. A preferred liquid hydrocarbon for use in accordance with this invention is refined oil comprised of aliphatic hydrocarbons having in the range of from about 15 to about 19 carbon atoms.

Any of a great variety of hydrophilic water soluble polymers which function as fluid loss control agents in oil field cements as well as mixtures of such polymers can be utilized. Generally, these include hydrophilic water soluble polymers selected from the group consisting of polysaccharides, polyacrylates, polyacrylamides, biopolymers such as xanthan gum, and one or more partially sulfited polymers described as being prepared by the caustic catalyzed condensation of formaldehyde with acetone or a substance derived from acetone, and reacted with a sulfite salt, wherein a sufficient amount of sulfonate groups are appended to the polymer to render it water soluble.

Preferred hydrophilic water soluble polymers include cellulose derivatives such as hydroxyethylcellulose, carboxymethylcellulose and carboxymethylhydroxyethylcellulose, hydrolyzed copolymers of acrylamide and 2-acrylamido, 2-methyl propane sulfonic acid, and copolymers of N,N-dimethylacrylamide and 2-acrylamido, 2-methyl propane sulfonic acid. Such polymers impart excellent fluid loss control to oil field cements while alleviating adverse side affects associated with other fluid loss additives such as high viscosity and cement set retardation.

The most preferred polymers for use in accordance with this invention are hydroxyethylcellulose, carboxymethylcellulose, carboxymethylhydroxyethylcellulose, one or more of the foregoing cellulose derivatives combined with one or more water soluble partially sulfited polymers prepared by the caustic catalyzed condensation of formaldehyde with acetone or a substance derived from acetone, and mixtures of such polymers. Of these, hydroxyethylcellulose having a hydroxyethyl molar substitution (M.S.) of 2.0 and carboxymethylhydroxyethylcellulose having a carboxymethyl degree of substitution (D.S.) of 0.4 and a hydroxyethyl molar substitution of 2.0 are most preferred. The polymer or polymers used in the liquid additive of this invention are present therein in an amount in the range of from about 1% to about 50% by weight of the additive.

Organophilic clay suspending agents useful herein are the reaction products of a smectite clay and an organic quaternary ammonium compound such as alkyl quaternary ammonium salts. The preferred smectite clay is bentonite clay and preferred organophilic clays are selected from the group consisting of dimethyl dihydrogenated tallow ammonium bentonite, methyl benzyl dihydrogenated tallow ammonium bentonite, dimethyl benzyl hydrogenated tallow ammonium bentonite and mixtures thereof. A particularly suitable and preferred organophilic clay is marketed under the trademark KEN-GEL ® by Imco Services, a division of Halliburton Company, of Houston, Tex. The organophilic clay suspending agent functions in the liquid additive to maintain the solid polymer in suspension for long time periods without excessive settling and is present in the additive in an amount in the range of from about 1% to about 5% by weight of the additive.

The organic sulfonate dispersant which functions to achieve a uniform dispersion in the additive is preferably selected from the group consisting of the salts of polyvinyl sulfonic acid and naphthalene sulfonic acid condensed with formaldehyde. The most preferred such dispersant is the sodium salt of naphthalene sulfonate condensed with formaldehyde. The dispersant is present in the additive in an amount in the range of from about 1% to about 25% by weight of the additive.

The liquid fluid loss control additive also optionally can contain a dispersant such as polyvinyl pyrrolidone present in an amount in the range of from about 1% to about 5% by weight of the additive.

The polyamide amine surfactant for oil wetting the polymer whereby it is readily dispersed in the hydrocarbon liquid is preferably selected from the group consisting of the condensation products of fatty acids having in the range of from about 14 to about 22 carbon atoms and ethylene amine compounds. The fatty acid or acids used can be vegetable or animal fatty acids which are saturated or unsaturated. The ethylene amine compounds can be one or more of ethylenediamine, diethylenetriamine or triethylenetetramine. A particularly suitable such polyamide amine surfactant is marketed by Special Products, a division of Champion Products Company of Houston, Tex. under the product designation 1982-8B. The polyamide amine surfactant used is present in the additive in an amount in the range of from about 0.1% to about 1.0% by weight of the additive.

The surfactant for stripping liquid hydrocarbon from the polymer when the hydrocarbon base additive is combined with water is preferably selected from the group consisting of aliphatic alcohols having in the range of from about 6 to about 18 carbon atoms reacted with in the range of from about 5 to about 10 moles of ethylene oxide per mole and octyl, nonyl and dodecyl phenol reacted with in the range of from about 4 to about 20 moles of ethylene oxide per mole. The most perferred such surface active agent is tridecyl alcohol reacted with about 6 moles of ethylene oxide. The surfactant used is present in the additive in an amount in the range of from about 1.0% to about 10.0% by weight of the additive.

A particularly preferred liquid fluid loss control additive for oil field cements of the present invention consist essentially of a liquid hydrocarbon having a low viscosity and a high flash point, a hydrophilic water soluble polymer selected from the group consisting of hydroxyethylcellulose, carboxymethylcellulose, caroxymethylhydroxyethylcellulose, one or more of the foregoing polymers combined with a water soluble partially sulfited polymer prepared by the caustic catalyzed condensation of formaldehyde with acetone or a substance derived from acetone, and mixtures thereof present in the additive in an amount of about 40% by weight of the additive, an organophilic clay suspending agent formed by the reaction of bentonite clay and an organic quaternary ammonium compound present in the additive in an amount of about 3% by weight of the additive, an organic sulfonate dispersant comprised of the sodium salt of naphthalene sulfonate condensed with formaldehyde present in the additive in an amount of about 4% by weight of the additive, a polyamide amine surfactant for oil wetting the polymer selected from the group consisting of the condensation products of fatty acids having in the range of from about 14 to about 22 carbon atoms and ethylene amine compounds present in the additive in an amount of about 0.5% by weight of the additive, and a surfactant for stripping liquid hydrocarbon from the polymer when in contact with water comprised of tridecyl alcohol reacted with about 6 moles of ethylene oxide present in the additive in an amount of about 5.0% by weight of the additive.

In use of the liquid fluid loss control additive of this invention, it is mixed with a hydraulic cement slurry or the water to be used in forming the slurry in an amount in the range of from about 1.0% to about 6.5% by weight of cement. The mixing can be carried out in any conventional manner using conventional equipment. Because the hydrophilic water soluble polymer in the liquid additive is suspended therein, it readily mixes with the cement slurry or water without forming gel balls or fish eyes. Because of the presence of the surfactant for stripping liquid hydrocarbon from the polymer in the additive, the polymer is rapidly dissolved in the water and effectively and efficiently functions as a fluid loss control agent which reduces fluid loss in the cement slurry during and after placement thereof.

The liquid fluid loss control additive of this invention can be utilized with all oil field cements including API Classes A-H and J cements, and with cement slurries which are prepared using fresh water, salt water or sea water.

In forming the liquid fluid loss control additive of this invention, the various components of the additive can be combined in any desired order provided that the hydrophilic water soluble polymer or polymers used are combined with the other components of the additive last. A preferred method of forming the additive is to first mix the organophilic clay suspending agent with the liquid hydrocarbon. The polyamide amine surfactant for oil wetting the polymer is next mixed with the liquid hydrocarbon-organophilic clay mixture followed by mixing the surfactant for stripping liquid hydrocarbon from the polymer therewith. The organic sulfonate dispersant is next combined with the mixture followed by the hydrophilic water soluble polymer or polymers used. The liquid additive can be prepared using conventional high shear mixing apparatus and then can be stored for long periods of time without appreciable solids settlement or the development of high viscosity settled material therein.

In order to facilitate a clear understanding of the liquid additives and methods of the present invention, the following example is given.

EXAMPLE

A series of tests are conducted to determine if the liquid fluid loss control additives of the present invention are as effective as the hydrophilic water soluble polymers alone in reducing fluid loss. Several cement slurries are prepared and various hydrophilic water soluble polymers and combinations of polymers, dispersants and other additives are combined directly therewith. Liquid additives of the present invention including the same polymers are mixed with other portions of the slurries, and all of the slurry portions are tested for fluid loss properties in accordance with API standard methods (API RP-10B). A number of the slurry portions are also tested for compressive strengths and thickening times in accordance with API standard methods. The results of these tests are given in Table I below.

TABLE 1

Fluid Loss, Compressive Strengths and Thickening Times of Cement Slurries

| Test No. | Water gal./sk. | Fine Silica, % by weight of dry cement | Retarder (calcium lignosulfonate), % by weight of dry cement | NaCl, % by weight of water | Liquid Fluid Loss Control Additive,[8] % of polymer by weight of dry cement | Solid Fluid Loss Control Additive, % of polymer by weight of dry cement | Fluid Loss at 1000 psi, cc/30 min. | 24 Hour compressive Strength, psi | Thickening Time at 125° F. (Schedule 5) hrs.: mins. |
|---|---|---|---|---|---|---|---|---|---|
| 1 | 5.0 | — | — | — | — | 0.6[2] | 45 (@ 100° F.) | 725 (@ 100° F.) | — |
| 2 | 5.0 | — | — | — | 0.6[3] | — | 60 (@ 100° F.) | 860 (@ 100° F.) | — |
| 3 | 5.0 | — | — | — | — | 0.8[2] | 26 (@ 100° F.) | 340 (@ 100° F.) | 7:25 |
| 4 | 5.0 | — | — | — | 0.8[3] | — | 22 (@ 100° F.) | 510 (@ 100° F.) | 6:15 |
| 5 | 4.3 | — | — | — | — | 0.75[4] | 50 (@ 140° F.) | 2920 (@ 140° F.) | 3:46 |
| 6 | 4.3 | — | — | — | 0.75[5] | — | 40 (@ 140° F.) | 2575 (@ 140° F.) | 4:41 |
| 7 | 4.3 | — | — | — | — | 1.0[4] | 64 (@ 140° F.) | 3200 (@ 140° F.) | — |
| 8 | 4.3 | — | — | — | 1.0[5] | — | 68 (@ 140° F.) | 3065 (@ 140° F.) | — |
| 9 | 5.2 | 35 | 0.4 | 18 | — | 1.0[6] | 270[9] (@ 190° F.) | — | — |
| 10 | 5.2 | 35 | 0.4 | 18 | 1.0[7] | — | 225[9] (@ 190° F.) | — | — |
| 11 | 5.2 | 35 | 0.4 | 18 | — | 1.2[6] | 83[9] (@ 190° F.) | — | — |
| 12 | 5.2 | 35 | 0.4 | 18 | 1.2[7] | — | 32 (@ 190° F.) | — | — |

TABLE 1-continued

Fluid Loss, Compressive Strengths and Thickening Times of Cement Slurries

| Test No. | Water gal./sk. | Fine Silica, % by weight of dry cement | Retarder (calcium lignosulfonate), % by weight of dry cement | NaCl, % by weight of water | Liquid Fluid Loss Control Additive,[8] % of polymer by weight of dry cement | Solid Fluid Loss Control Additive, % of polymer by weight of dry cement | Fluid Loss at 1000 psi, cc/30 min. | 24 Hour compressive Strength, psi | Thickening Time at 125° F. (Schedule 5) hrs.: mins. |
|---|---|---|---|---|---|---|---|---|---|
| 13 | 5.2 | 35 | 0.4 | 18 | — | 0.5[6] | — | 105 (@ 190° F.) | 7:38 |
| 14 | 5.2 | 35 | 0.4 | 18 | 0.5[7] | — | — | 330 (@ 190° F.) | 7:05 |

[1] Lone Star API Class H cement
[2] Solid Additive is comprised of hydroxyethylcellulose (HEC) and small quantity of organic sulfonate dispersant.
[3] Liquid Additive contains HEC and small quantity of organic sulfonate dispersant.
[4] Solid Additive is comprised of HEC and HEC combined with a partially sulfited polymer.
[5] Liquid additive contains HEC and HEC combined with a partially sulfited polymer.
[6] Solid Additive is comprised of HEC, an organic sulfonate dispersant and propylene glycol adsorbed on diatomaceous earth.
[7] Liquid Additive contains HEC, an organic sulfonate dispersant and propylene glycol adsorbed on diatomaceous earth.
[8] The liquid additives are comprised of liquid hydrocarbon, the polymer combinations described above in an amount of about 40% by weight of the additive, an organophilic clay in an amount of about 3% by weight, an organic sulfonate dispersant in an amount of 4% by weight, a polyamide amine surfactant in an amount of 0.5% by weight and a tridecyl alcohol (EO = 6) surfactant in an amount of about 5.0% by weight.
[9] Calculated value From Table I it can be seen that the liquid additives of the present invention function equivalently to solid additives mixed and dissolved directly in the cement slurries.

What is claimed is:

1. A liquid fluid loss control additive for oil field cements consisting essentially of a major amount of a liquid hydrocarbon, the balance of said additive comprising one or more hydrophilic water soluble polymers present in said additive in an amount in the range of from about 1% to about 50% by weight of said additive, an organophilic clay suspending agent present in said additive in an amount in the range of from about 1% to about 5% by weight of said additive, an organic sulfonate dispersant selected from the group consisting of the salts of polyvinyl sulfonic acid and naphthalene sulfonic acid condensed with formaldehyde present in said additive in an amount in the range of from about 1% to about 25% by weight of said additive, a polyamide amine surfactant for oil wetting said polymer selected from the group consisting of the condensation products of fatty acids having in the range of from about 14 to about 22 carbon atoms and ethylene amine compounds present in said additive in an amount in the range of from about 0.1% to about 1.0% by weight of said additive, and a surfactant for stripping liquid hydrocarbon from said polymer when in contact with water selected from the group consisting of aliphatic alcohols having in the range of from about 6 to about 18 carbon atoms reacted within the range of from about 5 to about 10 moles of ethylene oxide per mole and octyl, nonyl and dodecyl phenol reacted with in the range of from about 4 to about 20 moles of ethylene oxide per mole present in said additive in an amount in the range of from about 1% to about 10% by weight of said additive.

2. The additive of claim 1 wherein said hydrophilic water soluble polymer is selected from the group consisting of polysaccharides, polyacrylates, polyacrylamides, xanthan gum and mixtures of such polymers.

3. The additive of claim 2 wherein said organophilic clay suspending agent is the reaction product of bentonite clay and an organic quaternary ammonium compound.

4. The additive of claim 3 wherein said organic sulfonate dipersant is the sodium salt of naphthalene sulfonate condensed with formaldehyde.

5. The additive of claim 4 wherein said surfactant for stripping liquid hydrocarbon from said polymer when in contact with water is tridecyl alcohol reacted with about 6 moles of ethylene oxide.

6. A liquid fluid loss control additive for oil field cements consisting essentially of a major amount of a liquid hydrocarbon having a low viscosity and a high flash point, the balance of said additive comprising a hydrophilic water soluble polymer selected from the group consisting of hydroxyethylcellulose, carboxymethylcellulose, carboxymethylhydroxyethylcellulose, one or more of the foregoing polymers combined with a water soluble partially sulfited polymer prepared by the caustic catalyzed condensation of formaldehyde with acetone or a substance derived from acetone and mixtures thereof present in an amount up to about 50% by weight of said additive, an organophilic clay suspending agent formed by the reaction of bentonite clay and an organic quaternary ammonium compound present in said additive in an amount of about 3% by weight of said additive, an organic sulfonate dispersant comprised of the sodium salt of naphthalene sulfonate condensed with formaldehyde present in said additive in an amount of about 4% by weight of said additive, a polyamide amine surfactant for oil wetting said polymer selected from the group consisting of the condensation products of fatty acids having in the range of from about 14 to about 22 carbon atoms and ethylene amine compounds present in said additive in an amount of about 0.5% by weight of said additive and a surfactant for stripping liquid hydrocarbon from said polymer when in contact with water comprised of tridecyl alcohol reacted with about 6 moles of ethylene oxide present in said additive in an amount of about 5.0% by weight of said additive.

7. The additive of claim 6 wherein said hydrophilic water soluble polymer is carboxymethylhydroxyethylcellulose having a carboxymethyl degree of substitution of about 0.4 and a hydroxyethyl molar substitution of about 2.0.

8. The additive of claim 6 wherein said organophilic water soluble polymer is hydroxyethylcellulose having a hydroxyethyl molar substitution of about 1.5.

9. In a method of mixing an oil field cement comprised of a hydraulic cement, sufficient water to form a pumpable slurry and a hydrophilic water soluble polymer to reduce fluid loss therefrom, the improvement comprising mixing said hydrophilic water soluble polymer with said slurry in the form of a liquid additive to thereby prevent the polymer from forming agglomerated polymer particle masses in said slurry, the liquid additive consisting essentially of a major amount of a liquid hydrocarbon, the balance of said additive comprising a hydrophilic water soluble polymer present in said additive in an amount in the range of from about 1% to about 50% by weight of said additive, an organophilic clay suspending agent present in said additive in an amount in the range of from about 1% to about 5% by weight of said additive, an organic sulfonate dispersant selected from the group consisting of the salts of polyvinyl sulfonic acid and naphthalene sulfonic acid condensed with formaldehyde present in said additive in an amount in the range of from about 1% to about 5% by weight of said additive, a polyamide amine surfactant for oil wetting said polymer selected from the group consisting of the condensation products of fatty acids having in the range of from about 14 to about 22 carbon atoms and ethylene amine compounds present in said additive in an amount in the range of from about 0.1% to about 1.0% by weight of said additive, and a surfactant for stripping liquid hydrocarbon from said polymer when in contact with water selected from the group consisting of aliphatic alcohols having in the range of from about 6 to about 18 carbon atoms reacted with in the range of from about 5 to about 10 moles of ethylene oxide per mole and octyl, nonyl and dodecyl phenol reacted with in the range of from about 4 to about 20 moles of ethylene oxide per mole present in said additive in an amount in the range of from about 1% to about 10% by weight of said additive, said additive being admixed with said hydraulic cement in an amount in the range of from about 1.0% to about 6.5% by weight of said cement.

10. The method of claim 9 wherein said hydrophilic water soluble polymer is selected from the group consisting of polysaccharides, polyacrylates, polyacrylamides, xanthan gum and mixtures of such polymers.

11. The method of claim 10 wherein said organophilic clay suspending agent is the reaction product of bentonite clay and an organic quaternary ammonium compound.

12. The method of claim 10 wherein said organic sulfonate dispersant is the sodium salt of naphthalene sulfonate condensed with formaldehyde.

13. The method of claim 12 wherein said surfactant for stripping liquid hydrocarbon from said polymer when in contact with water is tridecyl alcohol reacted with about 6 moles of ethylene oxide.

14. In a method of mixing an oil field cement comprised of a hydraulic cement, sufficient water to form a pumpable slurry and a hydrophilic water soluble polymer to reduce fluid loss therefrom, the improvement comprising adding said hydrophilic water soluble polymer to said slurry in the form of a liquid additive, said liquid additive consisting essentially of a major amount of a liquid hydrocarbon having a low viscosity and a high flash point, the balance of said additive comprising a hydrophilic water soluble polymer selected from the group consisting of hydroxyethylcellulose, carboxymethylcellulose, carboxymethylhydroxyethylcellulose, one or more of the foregoing polymers combined with a water soluble partially sulfited polymer prepared by the caustic catalyzed condensation of formaldehyde with acetone or a substance derived from acetone and mixtures thereof present in an amount of about 40% by weight of said additive, an organophilic clay suspending agent formed by the reaction of bentonite clay and an organic quaternary ammonium compound present in said additive in an amount of about 3% by weight of said additive, an organic sulfonate dispersant comprised of the sodium salt of naphthalene sulfonate condensed with formaldehyde present in said additive in an amount of about 4% by weight of said additive, a polyamide amine surfactant for oil wetting said polymer selected from the group consisting of the condensation products of fatty acids having in the range of from about 14 to about 22 carbon atoms and ethylene amine compounds present in said additive in an amount of about 0.5% by weight of said additive and a surfactant for stripping liquid hydrocarbon from said polymer when in contact with water comprised of tridecyl alcohol reacted with about 6 moles of ethylene oxide present in said additive in an amount of about 5.0% by weight of said additive, said additive being admixed with said hydraulic cement in an amount in the range of from about 1% to about 6.5% by weight of said cement.

15. The method of claim 14 wherein said hydrophilic water soluble polymer is carboxymethylhydroxyethylcellulose having a carboxymethyl degree of substitution of about 0.4 and a hydroxyethyl molar substitution of about 2.0.

16. The method of claim 14 wherein said organophilic water soluble polymer is hydroxyethylcellulose having a hydroxyethyl molar substitution of about 1.5.

17. A method of forming a liquid fluid loss control additive for oil field cement having a long storage life without appreciable solids settlement or the development of high viscosity settled material comprising the steps of:
  (a) combining an organophilic clay suspending agent formed by the reaction of bentonite clay and an organic quaternary ammonium compound with a liquid hydrocarbon in an amount of about 3% by weight of said additive;
  (b) combining a polyamide amine surfactant for oil wetting said polymer selected from the group consisting of the condensation products of fatty acids having in the range of from about 14 to about 22 carbon atoms and ethylene amine compounds with the liquid hydrocarbon organophilic clay suspending agent mixture produced in step (a) in an amount of about 0.5% by weight of said additive;
  (c) combining a surfactant for stripping liquid hydrocarbon from said hydrophilic water soluble polymer when in contact with water comprised of tridecyl alcohol reacted with about 6 moles of ethylene oxide with the mixture produced in step (b) in an amount of about 5.0% by weight of said additive;
  (d) combining an organic sulfonate dispersant comprised of the sodium salt of naphthalene sulfonate condensed with formaldehyde with the mixture produced in step (c) in an amount of about 4% by weight of said additive; and
  (e) combining said hydrophilic water soluble polymer with the mixture produced in step (d) in an amount of up to about 50% by weight of additive, said liquid hydrocarbon comprising a major portion of said additive in addition to its other constituents.

18. The method of claim 17 wherein said hydrophilic water soluble polymer is selected from the group consisting of hydroxyethylcellulose, carboxymethylcellulose, carboxymethylhydroxyethylcellulose, one or more of the foregoing polymers combined with a water soluble partially sulfited polymer prepared by the caustic catalyzed condensation of formaldehyde with acetone or a substance derived from acetone and mixtures thereof.

19. The method of claim 17 wherein said hydrophilic water soluble polymer is carboxymethylhydroxyethylcellulose having a carboxymethyl degree of substitution of about 0.4 and a hydroxyethyl molar substitution of about 2.0.

20. The method of claim 17 wherein said organophilic water soluble polymer is hydroxyethylcellulose having a hydroxyethyl molar substitution of about 1.5.

* * * * *

UNITED STATES PATENT AND TRADEMARK OFFICE
CERTIFICATE OF CORRECTION

PATENT NO. : 4,687,516
DATED : August 18, 1987
INVENTOR(S) : John F. Burkhalter and Willis A. Weigand It is certified that error appears in the above-identified patent and that said Letters Patent is hereby corrected as shown below:

In column 3, line 35, the phrase "this invention is refined oil" should read --this invention is a refined oil--

In column 3, line 44, the phrase "xanthan gum, and one or more partially sulfited polymers" should read --xanthan gum, and one or more polymers of the foregoing types combined with one or more partially sulfited polymers --

Signed and Sealed this

Nineteenth Day of April, 1988

Attest:

DONALD J. QUIGG

Attesting Officer

Commissioner of Patents and Trademarks